United States Patent [19]

Obara

[11] Patent Number: 4,820,895
[45] Date of Patent: Apr. 11, 1989

[54] ELECTRIC DISCHARGE MACHINE POSITION FINDING APPARATUS

[75] Inventor: Haruki Obara, Sagamihara, Japan

[73] Assignee: Fanuc Ltd., Minamitsuru, Japan

[21] Appl. No.: 767,267

[22] PCT Filed: Dec. 18, 1984

[86] PCT No.: PCT/JP84/00601
§ 371 Date: Aug. 7, 1985
§ 102(e) Date: Aug. 7, 1985

[87] PCT Pub. No.: WO85/02800
PCT Pub. Date: Jul. 4, 1985

[30] Foreign Application Priority Data

Dec. 23, 1983 [JP] Japan ................. 58-243587

[51] Int. Cl.⁴ .............................. B23H 1/02
[52] U.S. Cl. ................. 219/69.13; 219/69.16
[58] Field of Search .......... 219/69 C, 69 S, 69 G, 219/69 M, 69 P, 69 R; 328/34, 35, 36

[56] References Cited

U.S. PATENT DOCUMENTS

| | | | |
|---|---|---|---|
| 2,455,373 | 12/1948 | Lester | 328/34 |
| 2,537,991 | 1/1951 | Grieg | 328/34 |
| 2,637,810 | 5/1953 | Moerman | 328/35 |
| 2,769,078 | 10/1956 | Matulaitis | 219/69 S |
| 2,949,578 | 8/1960 | Narud | 328/34 |
| 2,979,639 | 4/1961 | Williams et al. | 219/69 P |
| 3,517,154 | 6/1970 | Scarpelli et al. | 219/69 P |
| 3,655,936 | 4/1972 | Saito et al. | 219/69 S |
| 3,699,301 | 10/1972 | Losey | 219/69 S |
| 4,017,705 | 4/1977 | Bazhenov et al. | 219/69 P |
| 4,021,635 | 5/1977 | Losey et al. | 219/69 P |
| 4,236,057 | 11/1980 | Inoue | 219/69 C |
| 4,267,423 | 5/1981 | Bell, Jr. et al. | 219/69 S |
| 4,320,278 | 3/1982 | Bell, Jr. et al. | 219/69 G |
| 4,376,880 | 3/1983 | Inoue | 219/69 M |
| 4,447,713 | 5/1984 | Tsurumoto et al. | 219/69 S |
| 4,450,336 | 5/1984 | Inoue | 219/69 G |
| 4,450,337 | 5/1984 | Inoue | 219/69 P |

FOREIGN PATENT DOCUMENTS

| | | | |
|---|---|---|---|
| 2457304 | 6/1975 | Fed. Rep. of Germany | 219/69 P |
| 103297 | 9/1978 | Japan | 219/69 G |
| 55-31529 | 3/1980 | Japan . | |
| 569422 | 8/1977 | U.S.S.R. | 219/69 P |
| 634903 | 11/1978 | U.S.S.R. | 219/69 P |
| 751549 | 7/1980 | U.S.S.R. | 219/69 P |
| 793741 | 1/1981 | U.S.S.R. | 219/69 P |
| 859095 | 8/1981 | U.S.S.R. | 219/69 G |
| 952495 | 8/1982 | U.S.S.R. | 219/69 P |

OTHER PUBLICATIONS

*Electronic Fundamentals and Applications,* 2nd Edition by Ryder, Aug. 1960.

Primary Examiner—M. H. Paschall
Assistant Examiner—Geoffrey S. Evans
Attorney, Agent, or Firm—Staas & Halsey

[57] ABSTRACT

A position finding apparatus of an electric discharge machine has a switching device including a relay 3 set into operation when tool electrode position finding starts, so that the switching device turns off machining power applied across a workpiece W and a tool electrode P. At such time, a differentiated waveform, which is obtained by differentiating in a differentiating circuit 15, a square wave produced by a pulse oscillator, is applied across the workpiece W and tool electrode P. Thereafter, position finding is performed with regard to the tool electrode P. A resistor in the differentiating circuit 15 can be made variable in value to alter the differentiated waveform applied across the workpiece W and tool electrode P.

5 Claims, 3 Drawing Sheets

ELECTRIC DISCHARGE MACHINE POSITION FINDING APPARATUS

BACKGROUND OF THE INVENTION

This invention relates to a position finding apparatus in an electric discharge machine and, more particularly, to improvements in a position finding apparatus power supply unit of a simplified circuit construction in which a pulse oscillator is protected.

When performing electric discharge machining, such as wire-cut or engraving electric discharge machining, it is necessary to determine the relative positions of a workpiece and tool. A position finding apparatus is provided for this purpose. Conventionally, a DC power supply is used as the power supply of the position finding apparatus. However, since this is a single-polarity power supply, phenomena occur such as flawing of the workpiece surface due to an electrolytic effect between the workpiece and tool, as well as the attraction of the tool to the workpiece, particularly in a case where the tool is a wire used in performing wire-cut electric discharge machining. The result is that a decline in position finding precision is inevitable. Accordingly, it has been proposed to use, as the position finding power supply, an arrangement in which voltage pulses of both positive and negative polarity are generated and impressed across the workpiece and tool, thereby making the average voltage zero in order to solve the aforementioned problem. FIG. 1 is an overall circuit diagram for describing such prior art.

In FIG. 1, numeral 1 denotes a power supply unit for position finding. The power supply unit is composed of a pulse oscillator 11, a protective diode 12 for assuring that a reverse voltage does not occur, and a ballast transformer 13. $R_1$, $R_2$ denote resistors, P a tool electrode and W a workpiece. Numeral 2 designates a position finding signal generating circuit comprising an absolute value circuit 21, a filter 22 and a comparator 23. Numeral 3 represents a relay and 4 a machining power supply unit equipped with a transistor-controlled capacitor discharge circuit (not shown). With this construction, pulses from the pulse oscillator 11 are applied to the ballast transformer 13 when the relay 3 turns on the position finding power supply, whereby bipolar pulses are applied across the tool electrode P and workpiece W, so that the voltage across them becomes zero when the two are in contact. This voltage is compared with a reference voltage Vr by a comparator 23 which produces an output signal indicating the short-circuited state.

The above-described conventional power supply for position finding in an electric discharge machine uses a ballast transformer in order to generate a pulse-shaped voltage having positive and negative polarities. Therefore, at the instant the workpiece and tool are short circuited in the course of performing position finding, zero potential is developed across the workpiece and tool, thus changing the voltage. The change in voltage causes a back electromotive force to be produced by the ballast transformer 13, and the pulse oscillator 11 is damaged by the back electromotive force. To avoid this problem, the protective diode is provided or a protective resistor is used, so that a reverse voltage will not be impressed upon the pulse oscillator 11, or a limit switch is provided to prevent the reverse voltage from being applied to the pulse oscillator 11. This is not a satisfactory countermeasure, however, as costs are raised and the pulse waveform develops distortion.

SUMMARY OF THE INVENTION

Accordingly, an object of the present invention is to improve upon the drawbacks of the conventional position finding power supply, protect the pulse oscillator in the position finding power supply unit and simplify the circuit construction of the position finding power supply unit.

To achieve the foregoing object, the present invention provides an electric discharge machining position finding apparatus for repeatedly impressing a pulse-shaped voltage of positive and negative polarity across a tool electrode and a workpiece, and determining the relative positions of the tool electrode and workpiece by sensing contact between the tool electrode and the workpiece. The apparatus is provided with a pulse oscillator for generating a square wave of a prescribed period, and a differentiating circuit for converting the square wave from the pulse oscillator into a differentiated waveform which is applied across the tool electrode and workpiece. Further, according to the present invention, the value of a resistor constituting the differentiating circuit is capable of being adjusted.

As set forth above, the present invention is adapted to use a differentiating circuit in place of the ballast transformer of the conventional power supply unit for position finding in an electric discharge machine. This makes it possible to prevent damage to the pulse oscillator in the position finding power supply unit, enables a major simplification in the circuit construction of the positioning power supply unit and reduces cost.

Further, the state of contact between the workpiece and the tool electrode can be improved in accordance with the prevailing conditions by making it possible to adjust the value of the resistor in the above-mentioned differentiating circuit.

DESCRIPTION OF THE PREFERRED EMBODIMENT

An embodiment of the present invention will now be described in detail with reference to the drawings.

Figure 1:
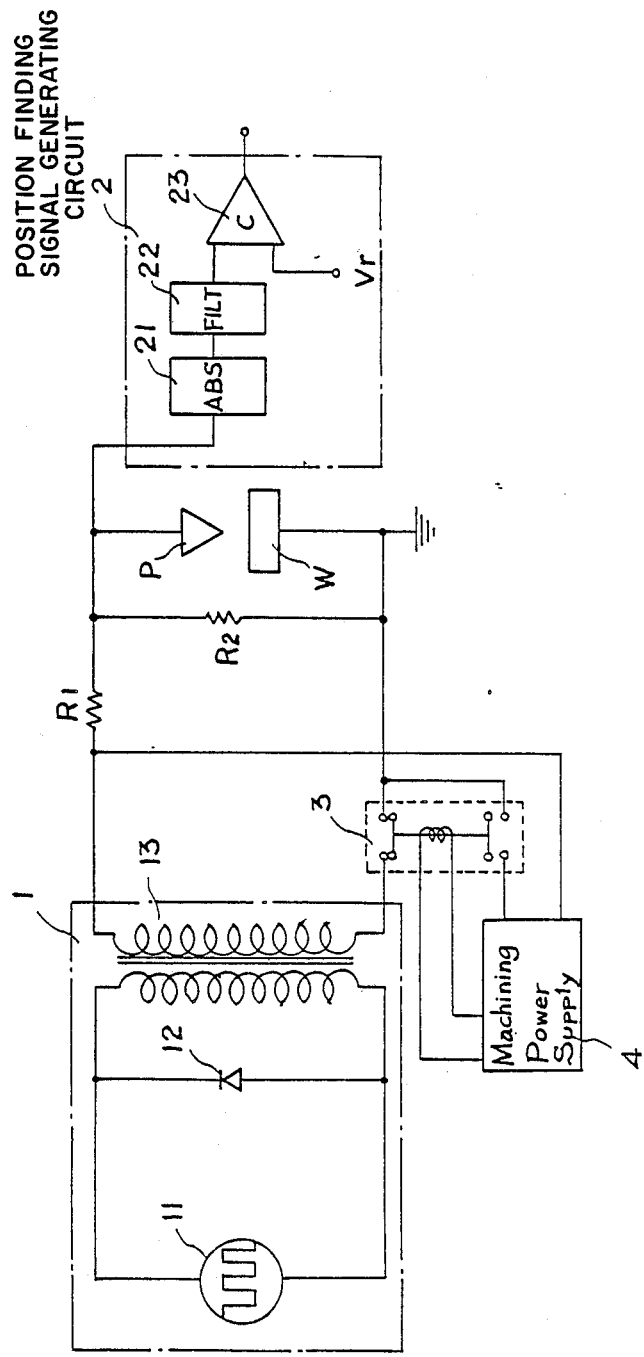
FIG. 1 is a circuit diagram of a conventional position finding apparatus of an electric discharge machine.
Figure 2:
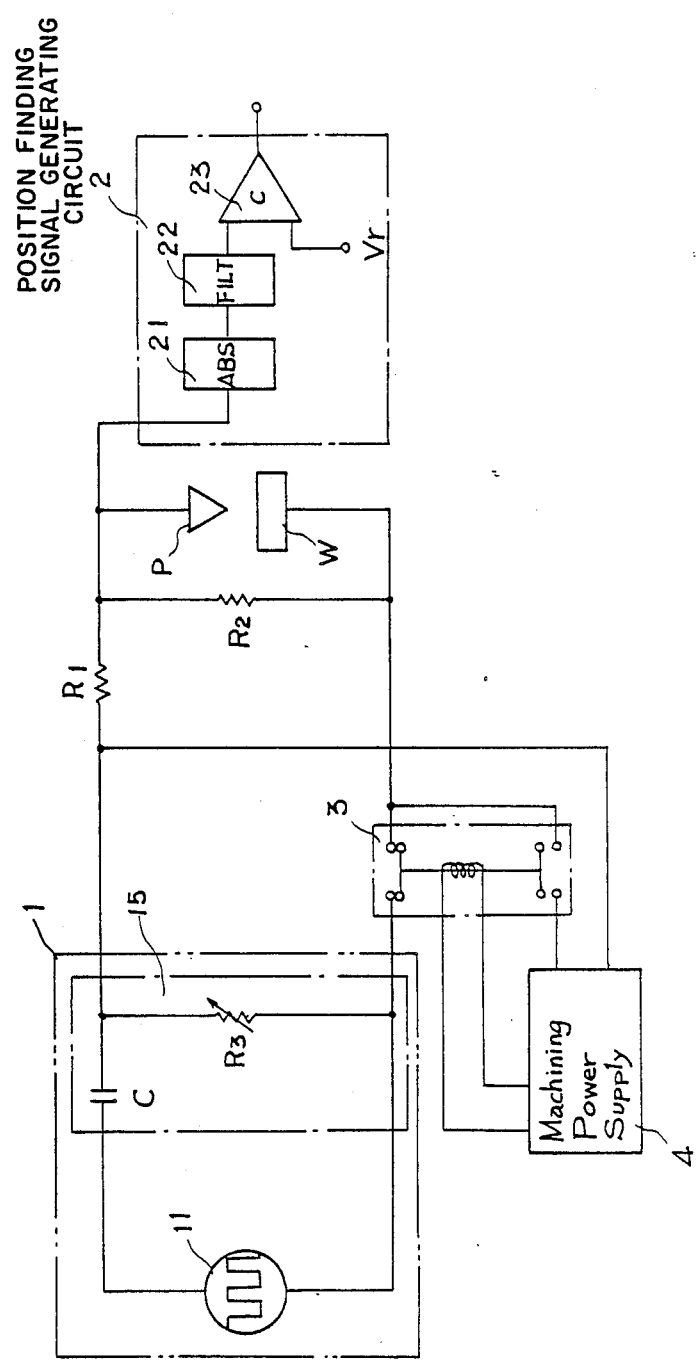
FIG. 2 is a circuit diagram of an embodiment of a position finding apparatus of an electric discharge machine in accordance with the present invention.

In FIG. 2, numeral 1 denotes a positioning power supply unit composed of the pulse oscillator 11 for generating square-wave pulses of a prescribed period, and a differentiating circuit 15 comprising a capacitor C and a resistor $R_3$. $R_1$, $R_2$ denote resistors, P the tool electrode and W the workpiece. Numeral 2 designates the position finding signal generating circuit comprising the absolute value circuit 21, the filter 22 and the comparator 23. Numeral 3 represents the relay, which is for switching between power from the machining power supply unit 4 for electric discharge machining and power from the position finding power supply unit 1.

The machining power supply unit 4 is equipped with, e.g., a transistor-controlled discharge circuit (not shown).

The operation of the embodiment of the present invention will now be described.

Figure 3:
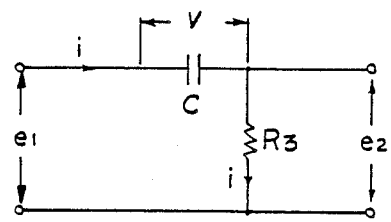
FIG. 3 is a diagram of a differentiating circuit, for describing the generation of a differentiated waveform.

In order to find the position of a tool electrode in electric discharge machining, a device (not shown), places the position finding power supply unit in the operating state. Concurrently, the relay 3 switches over to the position finding power supply unit side. Square-wave pulses of a prescribed period from the pulse oscillator 11 are applied to the pulse differentiating circuit 15, where the pulses are differentiated. In the differentiating circuit of the kind shown in FIGS. 2 and 3, let q represent the electric charge stored in the capacitor C. Since q is obtained by integrating, with respect to time, the current that flows into the capacitor C, q is expressed as follows:

$$q = \int i\, dt.$$

Since the following hold:

$$V = q/c = 1/c \cdot \int i\, dt$$

$$e_2 = iR$$

we may write $$e_1 = V + e_2 = 1/c \cdot \int i\, dt + iR.$$

If CR is so selected that $V \gg e_2$ holds, then we have $$1/c \cdot \int i\, dt \gg iR$$

$$e_1 = 1/c \cdot \int i\, dt.$$

Differentiating both side of this equation with respect to time t gives us $$de_1/dt = 1/c \cdot i.$$

Figure 4:
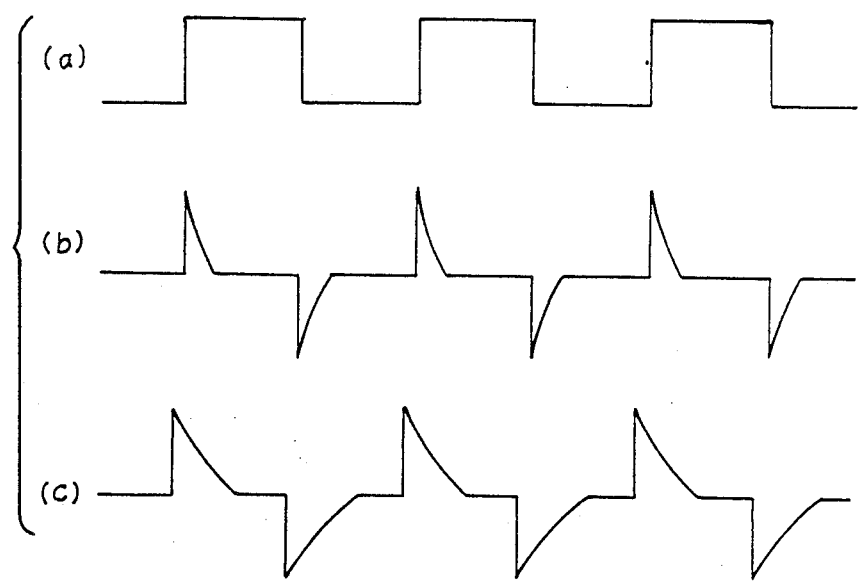
FIG. 4(a) is a waveform diagram of a waveform produced by a pulse oscillator.
FIGS. 4(b) and (c) are diagrams of differentiated waveforms.

In other words, $$i = C \cdot de_1/dt$$

$$\therefore e_2 = CR \cdot de_1/dt$$

so that output voltage $e_2$ approximates a waveform obtained by differentiating input voltage $e_1$. The smaller $e_2$ is in comparison with V, namely the smaller $e_2$ is in comparison with $e_1$, the more accurate the differentiated waveform becomes. The larger $e_2$ is made, the more imperfect the differentiated waveform becomes (see FIG. 4(c)). Accordingly, the pulses shown in FIG. 4(a) that are applied to the differentiating circuit 15 emerge from the differentiating circuit 15 as the differentiated waveform shown in FIG. 4(b). The differentiated waveform is applied across the tool electrode P and the workpiece W.

Note that even if there is a slight resistive film between the workpiece and the tool in a case where the two come into contact, the waveform has the shape of a sharp pulse and, hence, acts to wipe out the effect of the resistive film. In order to intensify this effect, $e_2$ can be enlarged to obtain the imperfect differentiated waveform shown in FIG. 4(c). To adjust the differentiated waveform to improve the state of contact between the workpiece and the tool, the resistor $R_3$ can be made freely adjustable.

In a case where the tool electrode P and the workpiece W are in a short-circuited state, this is sensed by the position finding signal generating circuit 2. More specifically, when the workpiece and tool electrode come into contact and are thus short circuited, the voltage across them becomes zero. This zero voltage is compared with the reference voltage $V_r$ by the comparator 23, which produces a short-circuit signal as an output to stop the table.

The present invention is well-suited for application to a wire-cut electric discharge machine but can also be applied to an engraving electric discharge machine without major modification.

What is claimed is:

1. An electric discharge machining position finding apparatus for repeatedly impressing a pulse-shaped voltage of positive and negative polarity across a tool electrode and a workpiece, and for determining the relative positions of the tool electrode and the workpiece by sensing contact between the tool electrode and the workpiece, comprising:

a machining power supply unit for applying power for electric discharge machining across the tool electrode and the workpiece;

a pulse oscillator for generating a square wave of a prescribed period at output terminals;

a differentiating circuit, coupled to said pulse oscillator, for receiving the square wave generated by said pulse oscillator and for producing a differentiated waveform, said differentiating circuit comprising a capacitor and a resistor coupled in series with the output terminals of said pulse oscillator, said differentiating circuit having output terminals at the terminals of said resistor; and a switching device, coupled to said differentiating circuit, said machining power supply unit and the workpiece, for applying the power for electric discharge machining from said machining power supply unit across the tool electrode and the workpiece when machining is to be performed, and for applying the differentiated waveform produced by said differentiating circuit across the tool electrode and the workpiece when position finding is to be performed.

2. An electric discharge machining position finding apparatus according to claim 1, wherein said resistor of said differentiating circuit has a resistance value which is capable of being adjusted.

3. An electric discharge machine having a tool electrode and a workpiece, and having a position finding signal generator circuit connected to the tool electrode for determining the relative positions of the tool electrode and the workpiece, comprising:

a machining power supply unit for supplying power for electric discharge machining;

generating means for generating a square wave having a predetermined period; and means for differentiating the square wave generated by said generating means to produce a differentiated waveform; and switching means for applying the supplied power for electric discharge machining from said machining power supply unit across the tool electrode and the workpiece when machining is to be performed, and for applying the differentiated waveform across the tool electrode and the workpiece when position finding is to be performed, said differentiating means comprising a differentiating circuit including:
a capacitor coupled to said generating means and connected to the tool electrode at a first node; and
a resistor coupled to the first node and coupled to said switching means.

4. An electric discharge machine according to claim 3, wherein said generating means comprises a pulse oscillator.

5. An electric discharge machine according to claim 4, wherein said switching means comprises a relay coupled to the workpiece, said resistor and said machining power supply unit.

* * * * *